(12) United States Patent
Chabanne

(10) Patent No.: US 7,942,324 B2
(45) Date of Patent: May 17, 2011

(54) METHOD FOR COMMUNICATING BETWEEN A READER AND A WIRELESS IDENTIFICATION MARKER, ASSOCIATED READER AND MARKER

(75) Inventor: Hervé Chabanne, Mantes la Jolie (FR)

(73) Assignee: Morpho, Paris (FR)

( * ) Notice: Subject to any disclaimer, the term of this patent is extended or adjusted under 35 U.S.C. 154(b) by 665 days.

(21) Appl. No.: 11/911,334

(22) PCT Filed: Mar. 30, 2006

(86) PCT No.: PCT/FR2006/000703
§ 371 (c)(1),
(2), (4) Date: Mar. 31, 2008

(87) PCT Pub. No.: WO2006/108940
PCT Pub. Date: Oct. 19, 2006

(65) Prior Publication Data
US 2008/0185434 A1    Aug. 7, 2008

(30) Foreign Application Priority Data

Apr. 15, 2005   (FR) ...................................... 05 03821

(51) Int. Cl.
*G06K 7/00* (2006.01)
(52) U.S. Cl. .................................. 235/439; 235/462.46
(58) Field of Classification Search .................. 235/439, 235/492, 462.46, 472.02
See application file for complete search history.

(56) References Cited

U.S. PATENT DOCUMENTS

| | | | | |
|---|---|---|---|---|
| 6,150,955 A * | 11/2000 | Tracy et al. | ............. | 340/870.02 |
| 7,007,849 B2 * | 3/2006 | Schmidt et al. | .......... | 235/462.22 |
| 7,427,024 B1 * | 9/2008 | Gazdzinski et al. | ......... | 235/384 |
| 7,477,917 B2 * | 1/2009 | Rofougaran et al. | ...... | 455/552.1 |
| 7,603,894 B2 * | 10/2009 | Breed | ............................. | 73/146 |

OTHER PUBLICATIONS

Cachin et al., "Linking Information Reconciliation and Privacy Amplification," *Journal of Cryptology*, pp. 1-12, 1997.
Liu et al., "A Practical Protocol for Advantage Distillation and Information Reconciliation," *Designs, Codes and Cryptography*, Kluwer Academic Publishers, pp. 39-62, The Netherlands, 2003.
Brassard et al. "Secret-Key Reconciliation by Public Discussion," *Advances in Cryptology—Eurocrypt '93*, pp. 410-423, 1998.
Gander et al., "On the Secret-Key Rate of Binary Random Variables," *Proceedings of the 1994 IEEE International Symposium on Information Theory*, 1994.
Bennett et al., "Generalized Privacy Amplification," *IEEE Transaction on Information Theory*, 1995.
Translation of the International Preliminary Report on Patentability for PCT/FR2006/000703.

* cited by examiner

*Primary Examiner* — Daniel St.Cyr
(74) *Attorney, Agent, or Firm* — Marshall, Gerstein & Borun LLP

(57) ABSTRACT

A method includes transmitting a first digital channel ($X_0$) from a reader to a marker, receiving a second digital channel ($Y_0$) corresponding to the first digital channel and to errors introduced by a noisy channel, introducing artificial errors into at least one of the first or second digital channels, carrying out an advantage distillation phase in such a way that a new first digital channel ($X_1$) is determined for the reader. A new second digital channel ($Y_1$) is determined for the marker such that the advantage is taken with respect to a possible passive attacker. In an information reconciliation phase, an error-correcting protocol is applied to the new first ($X_2$) and new second ($Y_2$) digital channel, and in carrying out a secrecy amplification phase, a hash function (G) is applied to the new first ($X_2{}^*$) and the new second ($Y_2{}^*$) digital channel.

7 Claims, 2 Drawing Sheets

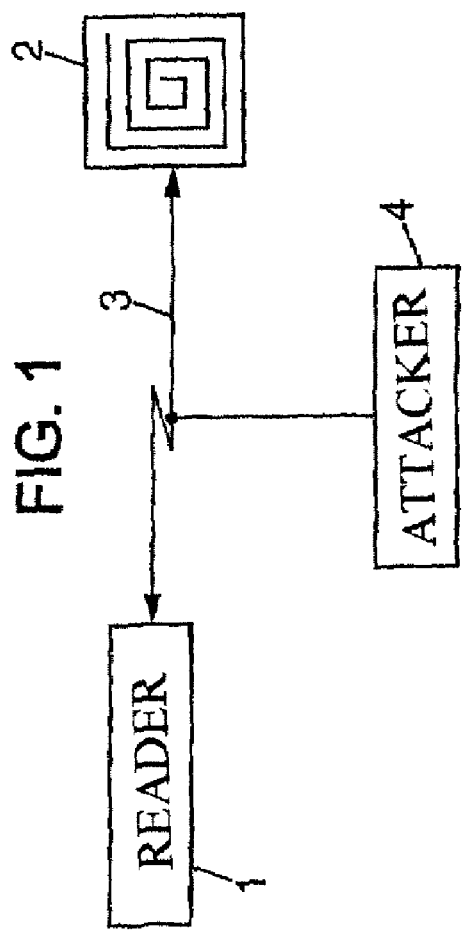
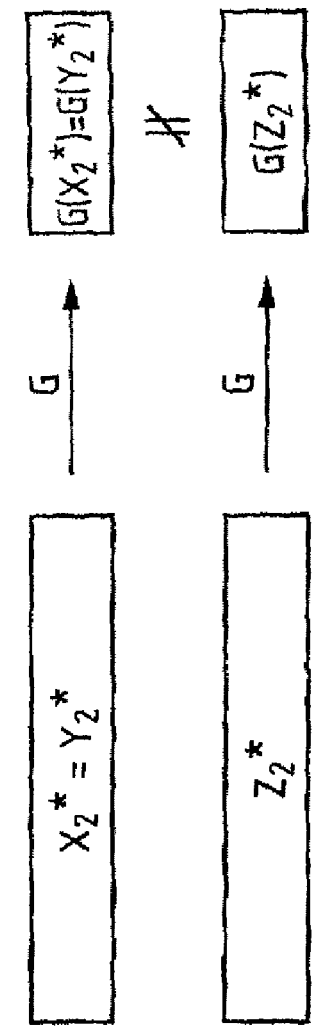

METHOD FOR COMMUNICATING BETWEEN A READER AND A WIRELESS IDENTIFICATION MARKER, ASSOCIATED READER AND MARKER

The present invention relates to communication between a wireless reader and a wireless identification marker.

BACKGROUND OF THE INVENTION

A wireless identification marker is understood to mean any wireless entity comprising a component with reduced dimensions, comprising a circuit and transmission/reception means. The marker may, for example, be a Radio Frequency Identification (RFID) label, the transmission/reception means of which comprise a radio antenna. It may also involve a contactless smart card. An infrared marker may also be envisaged.

Wireless markers of this type are known and are capable of transmitting, at the request of a wireless identification reader, a unique identifier comprising around one hundred bits over a distance of several meters.

Some of these markers, such as the RFID labels, for example, have low computing capacities. This rules out the possibility of securing the transmissions with a corresponding reader using conventional arithmetically based solutions.

However, use of these markers can only be conceived and generalized if it provides for sufficiently reliable security mechanisms.

To this end, it has been proposed to exploit the noise inherent in the communication channel between a marker and a corresponding reader to provide confidentiality of exchanges in the presence of a passive attacker, i.e. an attacker content to listen to exchanges without interacting with the marker or reader.

However, even if the protocol proposed for this purpose has the merit of being simple to implement, it is based on the hypothesis that the errors with which the attacker is confronted when listening to the exchanges are independent from those introduced by the noisy communication channel between the marker and the reader.

In practice, this hypothesis is not always verified. In particular, the attacker may have sufficient listening capacities to determine the data received by the marker or the reader through correlation on the basis of the data which he receives.

An object of the present invention is to offer a more satisfactory level of security between a wireless identification reader and a wireless identification marker.

SUMMARY OF THE INVENTION

The invention therefore proposes a method for communicating between a wireless identification reader and a wireless identification marker via a noisy channel, comprising:

/a/ the transmission of a first numeric string from the reader to the marker;

/b/ the reception, on the marker, of a second numeric string corresponding to the first numeric string, excepting errors introduced by the noisy channel;

/c/ the introduction of artificial errors into at least one of the first and second numeric strings;

/d/ an advantage distillation phase in which a new first numeric string is determined on the reader on the basis of the first numeric string, and a new second numeric string is determined on the marker on the basis of the second numeric string, in such a way as to take the advantage with respect to a possible passive attacker;

/e/ an information reconciliation phase, wherein an error-correction protocol is applied to the new first and the new second numeric string in such a way that, at the end of step /e/, the new first and the new second numeric string are identical with a predetermined probability level; and /f/ a secrecy amplification phase, wherein a hash function is applied to the new first and the new second numeric string.

The introduction of artificial errors into the first and/or the second numeric string, in addition to the natural errors linked to the noise introduced by the noisy communication channel, enables weakening or removal of the possible correlation of the errors affecting the reader or the marker on the one hand, and the attacker listening to the noisy channel on the other hand. This therefore complicates the task of the attacker, who is no longer able to deduce the information received by the marker from the information which he acquires.

Such an introduction of artificial errors, which may consist in the modification of certain, for example randomly chosen, numerical values of the first and/or the second numeric string, is moreover simple to implement.

The steps of the method are advantageously implemented so that the new first and the new second numeric string are identical, with a predetermined probability level, preferably close to 100%. Thus, the hash function will produce an identical reduced value when it is applied to the new first and to the new second numeric string.

Step /d/ may advantageously be repeated a number of times depending on the noise estimated on the noisy channel.

The invention furthermore proposes a wireless identification reader suitable for communicating with a wireless identification marker via a noisy channel, comprising:

means for transmitting a first numeric string to the marker;

means for introducing artificial errors into the first numeric string;

means for determining a new first numeric string on the basis of the first numeric string, in such a way as to take the advantage with respect to a possible passive attacker;

means for applying an error-correction protocol to the new first numeric string; and means for applying a hash function to the new first numeric string.

The invention also proposes a wireless identification marker suitable for communicating with a wireless identification reader via a noisy channel, comprising:

means for receiving a second numeric string corresponding to a first numeric string transmitted by the reader, excepting errors introduced by the noisy channel;

means for introducing artificial errors into the second numeric string;

means for determining a new second numeric string on the basis of the second numeric string, in such a way as to take the advantage with respect to a possible passive attacker;

means for applying an error-correction protocol to the new second numeric string; and means for applying a hash function to the new second numeric string.

BRIEF DESCRIPTION OF THE DRAWINGS

Other characteristics and advantages of the present invention will be set out in the following description of non-limiting exemplary embodiments, with reference to the attached drawings, in which:

FIG. 1 is a diagram showing in a simplified manner a system in which the invention can be implemented;

FIGS. 2-5 show simplified numeric strings implemented in an exemplary embodiment of the invention;

FIG. 6 is a diagram showing in a simplified manner a hash operation implemented in an exemplary embodiment of the invention.

DETAILED DESCRIPTION OF PREFERRED EMBODIMENTS

FIG. 1 shows an RFID reader 1 suitable for communicating with an RFID label 2. It will be noted that any other type of wireless marker (smart card, infrared marker, etc.) which has capacities to communicate with a corresponding reader could also be used within the scope of the invention.

The reader 1 and the label 2 are suitable for exchanging numeric strings, i.e. sequences of numerical, for example binary, values via a radio communication channel 3. The channel 3 is generally noisy, i.e. it introduces errors into each transmission. Thus, if the reader 1 transmits a numeric string on the channel 3, the label 2 receives a numeric string which differs more or less from the transmitted numeric string according to the noise level introduced by the channel 3.

It is furthermore supposed that a passive attacker 4 tries to acquire the data exchanged between the reader 1 and the label 2. To do this, the attacker 4 listens to the channel 3 and may carry out any type of operation on the acquired data in order to thwart the security implemented between the reader 1 and the label. By way of example, the attacker 4 my implement the same operations as the reader 1 or the label 2.

In the example described below, an attempt is made to obtain information, or a "key", from the label 2 without the attacker 4 being able to acquire it himself. This key may the be used to implement security mechanisms between the reader 1 and the label 2.

Figure 2:
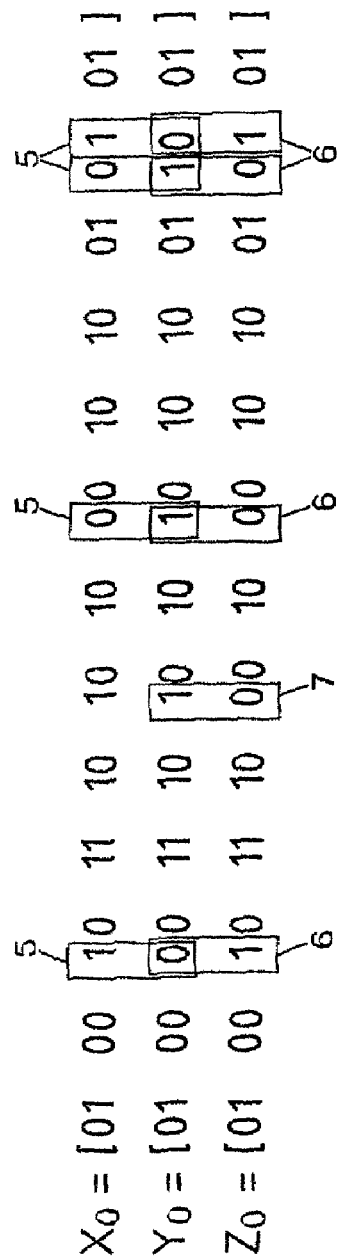

FIG. 2 shows an example of a numeric string $X_0$ transmitted by the reader 1 to the label 2 via the noisy channel 3. It will be noted that the chosen example of a numeric string comprises a reduced number of bits, i.e. binary elements, to facilitate the understanding of the operations implemented. In reality, the numeric strings transmitted by the reader may be in the order of ten thousand bits, for example.

Due to the noise present on the channel 3, the label 2 receives a numeric string $Y_0$, of which certain bits differ from the corresponding bits of $X_0$. These differences 5 are shown in FIG. 2. They are four in number.

It is then chosen to consider the numeric string $Y_0$ as the reference string, i.e. $Y_0$ is considered, by convention, to comprise no errors. Conversely, the differences between bits of other numeric strings and the corresponding bits of $Y_0$ are considered as errors. This is, of course, hypothetical. Other choices of reference strings are equally possible, such as $X_0$, for example.

The attacker 4 who listens to the noisy channel 3 in turn receives a numeric string $Z_0$ which differs from $X_0$ by dint of the noise introduced by the channel 3. $Z_0$ also differs from $Y_0$, particularly because the attacker may be present at a location slightly different from the label 2 and because the characteristics of the channel 3 may vary in time and space. The errors contained in $Z_0$ may be independent or relatively weakly correlated with those contained in $Y_0$.

Thus, it will be noted in the example shown in FIG. 2 that $Z_0$ presents five differences compared with $Y_0$. Four of these differences (differences 6) are the same as the differences 5 between $X_0$ and the reference string $Y_0$, whereas the fifth (difference 7) is an error introduced by the channel 3 between the reader 1 and the attacker 4.

According to the invention, the reader 1 calculates a new numeric string $X'_0$, as a replacement for $X_0$, by modifying certain bits of $X_0$. This modification thus consists in introducing artificial errors, for example in a random manner, into $X_0$. These artificial errors do not depend on the noisy channel 3. They are superadded to the "natural" errors introduced by the noisy channel 4. The combination of the natural and artificial errors between the reader 1 and the label 2 thus prevents the attacker 4, even if he possesses sufficient listening capacities, from discovering any correlation between these errors and the errors to which he himself is subjected when listening to the noisy channel 3. In fact, even if the natural errors introduced by the channel 3 to the label 2 and to the attacker 4 are correlated, the additional introduction of artificial errors by the reader 1 weakens or even removes this correlation.

As a variant, the artificial errors may be introduced by the label 2 into the numeric string $Y_0$. They may also be introduced simultaneously into the two numeric strings $X_0$ and $Y_0$ by the reader 1 and the label 2 respectively.

Figure 3:
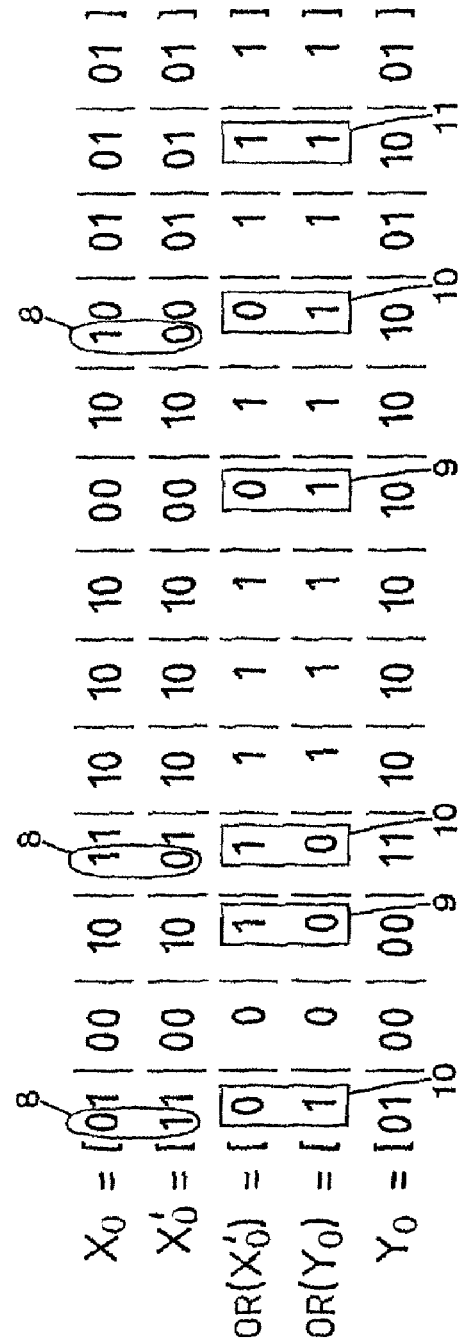

In the example shown in FIG. 3, three artificial errors have been introduced by the reader 1 into the numeric string $X_0$ by transforming values "1" into "0" and vice versa. As a result, the modified string $X'_0$ comprises three differences compared with $X_0$ (differences 8).

The other operations described below are known.

An advantage distillation phase is first carried out in which the probability is increased that the attacker 4 has a numeric string with a greater number of differences compared with $X'_0$ than the numeric string obtained in the label 2. In other words, this phase enables the reader 1-label 2 pair to take the advantage with respect to the passive attacker. An example of operations implemented in an advantage distillation phase of this type has been disclosed by Martin Gander and Ueli Maurer in the article entitled "On the secret-key rate of binary random variables, Proc. 1994 IEEE International Symposium on Information Theory (Abstracts), 1994", p. 351. Other operations can of course be implemented provided that they enable the advantage to be taken with respect to the passive attacker.

In one example of an advantage distillation phase of this type, the numeric strings $X'_0$ and $Y_0$ are divided up into groups of N numerical values, where N is an integer. In the example shown in FIG. 3, the bits of $X'_0$ and $Y_0$ are grouped in pairs (N=2). Then, for each pair thus identified, an "exclusive OR" (XOR) is applied in order to obtain a "1" if the bits of the pair concerned are different and a "0" if they are identical.

The results of the exclusive OR are then compared over corresponding groups (i.e. of the same ranking) of $X'_0$ and $Y_0$. To do this, both the reader 1 and the label 2 transmit on the channel 3 the results of the exclusive OR which they have carried out.

New numeric strings $X_1$ and $Y_1$ are then determined, retaining the first numerical values of each group of $X'_0$ and $Y_0$ respectively for which the result of the exclusive OR is the same as for the corresponding group of the other numeric string ($Y_0$ or $X'_0$). The other groups are ignored and are not taken into account in the make-up of the numeric strings $X_1$ and $Y_1$.

The example shown in FIG. 3 reveals five differences between bits of the exclusive OR carried out on $X'_0$ and $Y_0$ respectively. Some of these differences are caused by natural errors introduced by the channel 3 (differences 9). Other differences are explained by the introduction of artificial errors into the initial string $X_0$ (differences 10). It will be noted that the exclusive OR carried out on the penultimate pair (reference 11 in FIG. 3) has the same result, i.e. a "1", for $X'_0$ and $Y_0$ due to the fact that both of the bits of the pair in question of $X_0$ have been modified by the noisy channel 3 before being received in the label 2.

Figure 4:
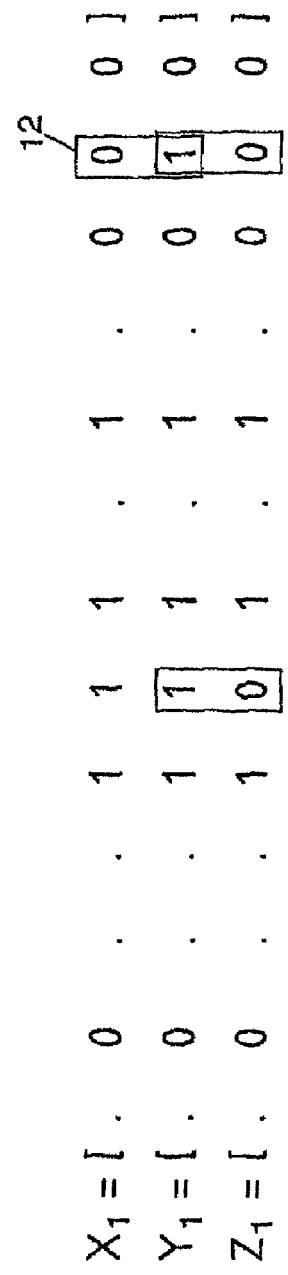

The numeric strings $X_1$ and $Y_1$ resulting from this advantage distillation phase are shown in FIG. 4. $Y_1$ then becomes the new reference. It will be noted that $X_1$ and $Y_1$ reveal a single difference between themselves (difference 12), compared with four differences between $X_0$ and $Y_0$. It will thus be understood that the advantage distillation may cause a rapid decrease in the number of differences between the numeric strings of the reader 1 and the label 2.

If the attacker 4 decides to act in the same way as the reader 1 and the label 2, he can then pick up the results of the exclusive OR exchanged between the latter and from these can deduce a string $Z_1$ according to the same principles. $Z_1$ then comprises the first bit of each pair of $Z_0$ which has the same ranking as two corresponding pairs of $X'_0$ and $Y_0$ for which the same result of the exclusive OR was obtained. As shown in FIG. 4, the numeric string $Z_1$ obtained in the example comprises two differences compared with $Y_1$ and still one difference compared with $X_1$.

The advantage distillation phase may be repeated a number n of times, where n is an integer, until the numeric string $X_n$ has an error rate in relation to $Y_n$ which is below a chosen threshold. For example, the number n may be chosen according to the estimated noise on the communication channel 3.

In the example shown in the figures, identical numeric strings of the reader 1 and the label 2 are obtained as from the second pass of the advantage distillation phase. In fact, as shown in FIG. 5, the strings $X_2$ and $Y_2$ are identical.

Conversely, the string $Z_2$ obtained in the second pass by an attacker 4 who implements the same operations as the reader 1 and the label 2 remains different from the reference string $Y_2$.

It can be shown that, regardless of the noise present on the noisy channel 3 and regardless of the technique used by the attacker 4 to try to discover the numeric strings obtained by the reader 1 and/or the label 2, this attacker will still obtain an incorrect numeric string, i.e. different from those of the reader 1 and the label 2.

An information reconciliation phase is then implemented. It consists in once more eliminating residual errors in the numeric string of the reader 1 (or of the label 2 if the reference is the string of the reader) in cases where the advantage distillation has not already removed all errors.

An error-correction protocol is used in this information reconciliation phase. This protocol should preferably be chosen in order to minimize the information which is to be transmitted on the channel 3 and which could represent relevant information which can be exploited by the attacker 4.

An example of a protocol is the "Cascade" protocol described by G. Brassard and L. Salvail in the article entitled "Secret-key reconciliation by public discussion, EUROCRYPT '93: Workshop on the theory and application of cryptographic techniques on Advances in cryptology, Springer-Verlag New York, Inc., 1994, pp. 410-423".

With the Cascade protocol, the two parties involved in the communication agree randomly and publicly to a permutation which they respectively apply to the numeric strings which they have obtained at the end of the advantage distillation. The result of these permutations is then split up into blocks with a determined adaptive size. A DICHOT primitive is carried out on each block obtained in this way. If the parity of the corresponding blocks for the two parties is identical, the calculated primitive returns the position of a difference within these blocks. One of the parties then corrects this error. Additional "bactracking" steps are also provided in order to ensure that the set referencing all of the blocks whose parity has been modified following the correction of an error are finally empty.

A known, Cascade-based protocol, but in which (i) the permutation implemented is pre-wired and non-random, (ii) the size of the blocks is fixed and non-adaptive, and (iii) the backtracking is not implemented, is preferably applied to the reader 1 and the label 2. The implementation of a simplified protocol of this type has the advantage of being less expensive than for Cascade, particularly in terms of computing capacity and memory size. In practice, most of the errors are corrected as from the first pass, so that the performance of this simplified protocol is satisfactory.

At the end of the information reconciliation phase, the reader 1 and the label 2 have the same numeric string with a predetermined probability level. In the example described with reference to the figures, $X_2^*$ and $Y_2^*$ denote the identical numeric strings thus obtained by the reader 1 and the label 2 respectively, i.e. the strings $X_2$ and $Y_2$ after correction. The attacker 4 in turn has a numeric string $Z_2^*$ which differs from $X_2^*$ and $Y_2^*$, thanks in particular to the initial introduction of artificial errors into $X_0$ and equally thanks to the properties of the advantage distillation and information reconciliation phases.

A third so-called secrecy amplification phase is then implemented. The object of a phase of this type was disclosed by Charles H. Bennett, Gilles Brassard, Claude Crépeau and Ueli M. Maurer in the article entitled "Generalized privacy amplification, IEEE Transaction on Information Theory (1995)". It consists in applying a hash function to the numeric strings obtained by the reader 1 and the label 2 at the end of the preceding phase, i.e. to $X_2^*$ and $Y_2^*$ in our example.

A hash function is a compression function enabling information to be obtained which is shorter than initial information to which it is applied. It furthermore has the property of delivering very different results on the basis of initial information elements which differ even slightly, i.e. they emphasize the differences between different information elements in such a way as to prevent anyone from simply obtaining initial information on the basis of the result of the hashing.

An example of a hash function which can be used is the hash function disclosed by Kaan Yüksel in the document entitled "Universal hashing for ultra-low-power cryptographic hardware applications, Master's thesis, Worcester Polytechnic Institute, 2004". The advantage of this function is that it requires very few computing resources, which is in accordance with the constraints of the RFID labels.

FIG. 6 shows the application of the hash function G to $X_2^*$ and $Y_2^*$. Since $X_2^*=Y_2^*$, this therefore gives $G(X_2^*)=G(Y_2^*)$. Thus, the reader 1 and the label 2 finally have the same numeric string with a limited size. In a real case, $G(X_2^*)$ and $G(Y_2^*)$ are, for example, numeric strings comprising the order of around one hundred bits.

Conversely, the attacker 4 has a string $Z_2^*$ which differs from $X_2^*$ and $Y_2^*$. Even if this attacker knows the hash function used by the reader 1 and the label 2 and tries to calculate $G(Z_2^*)$, he will thus obtain a numeric string different from $G(X_2^*)$ and $G(Y_2^*)$.

The numeric string $G(X_2^*)=G(Y_2^*)$ common to the reader 1 and the label 2 can subsequently be used to secure the exchanges on the channel 3. For example, this string may be used as a secret key to enable authentication of the reader 1 or the label 2, or to encrypt the data transmitted on the noisy channel 3 for example. Other applications can equally be envisaged on the basis of the determination of this secret key.

The invention claimed is:

1. A method for communicating between a wireless identification reader and a wireless identification marker via a noisy channel, comprising:
   /a/ transmitting a first numeric string from the reader to the marker;
   /b/ receiving, on the wireless identification marker, a second numeric string corresponding to the first numeric string, excepting errors introduced by the noisy channel;
   /c/ modifying at least one of the first and second numeric strings by introducing artificial errors into at least one of the first and second numeric strings;
   /d/ performing an advantage distillation phase in which a third numeric string is determined on the reader on the basis of the first numeric string resulting from step /c/, and a fourth numeric string is determined on the wireless identification marker on the basis of the second numeric string resulting from step /c/, in such a way as to take an advantage with respect to a possible passive attacker;
   /e/ performing an information reconciliation phase, wherein an error-correction protocol is applied to the third and the fourth numeric strings so as to obtain, at the end of step /e/, respective fifth and sixth numeric strings which are identical with a predetermined probability level; and
   /f/ performing a secrecy amplification phase, wherein a hash function is applied to the fifth and the sixth numeric strings, so as to obtain a numeric string which can be used to secure the exchanges on the noisy channel.

2. The method as claimed in claim 1, in which the advantage distillation phase comprises the following steps:
   dividing up the first and second numeric strings resulting from step /c/ into groups of N successive numerical values, where N is an integer;
   carrying out an exclusive OR on each of said groups;
   exchanging the results of the exclusive OR between the reader and the marker;
   determining the third numeric string is determined on the reader on the basis of the first numerical value of each group of the first numeric string resulting from step /c/ for which the result of the exclusive OR is identical to the result of the exclusive OR carried out on the corresponding group of the second numeric string resulting from step /c/; and
   determining the fourth numeric string on the marker on the basis of the first numerical value of each group of the second numeric string resulting from step /c/ for which the result of the exclusive OR is identical to the result of the exclusive OR carried out on the corresponding group of the first numeric string resulting from step /c/.

3. The method as claimed in claim 1 in which introducing artificial errors in step /c/ comprises randomly modifying numerical values of at least one of the first and second numeric strings.

4. The method as claimed in claim 1, in which step /d/ is repeated a number of times depending on the estimated noise of the noisy channel.

5. The method as claimed in claim 1, in which the error-correction protocol is chosen in such a way as to allow a minimum of information to be leaked to a possible passive attacker.

6. A wireless identification reader suitable for communicating with a wireless identification marker via a noisy channel, comprising:
   means for transmitting a first numeric string to the marker;
   means for modifying the first numeric string by introducing artificial errors into the first numeric string;
   means for determining a second numeric string on the basis of the modified first numeric string, in such a way as to take an advantage with respect to a possible passive attacker;
   means for applying an error-correction protocol to the second numeric string, so as to obtain a third numeric string; and
   means for applying a hash function to the third numeric string, so as to obtain a numeric string which can be used to secure the exchanges on the noisy channel.

7. A wireless identification marker suitable for communicating with a wireless identification reader via a noisy channel, comprising:
   means for receiving a second numeric string corresponding to a first numeric string transmitted by the reader, excepting errors introduced by the noisy channel;
   means for modifying the second numeric string by introducing artificial errors into the second numeric string;
   means for determining a third numeric string on the basis of the modified second numeric string, in such a way as to take an advantage with respect to a possible passive attacker;
   means for applying an error-correction protocol to the third numeric string, so as to obtain a fourth numeric string; and
   means for applying a hash function to the fourth numeric string, so as to obtain a numeric string which can be used to secure the exchanges on the noisy channel.

* * * * *